F. Q. HARTMAN.
GREASE CUP.
APPLICATION FILED MAY 15, 1915.
1,153,074.
Patented Sept. 7, 1915.
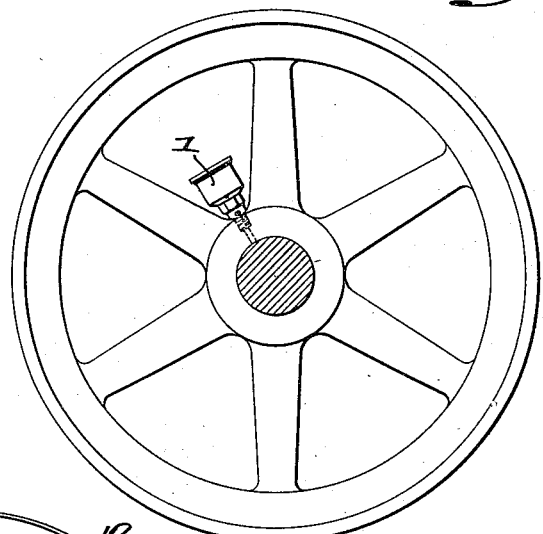
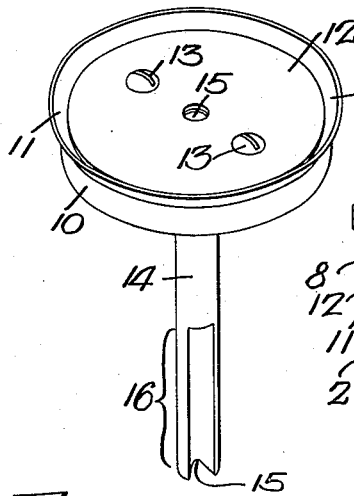
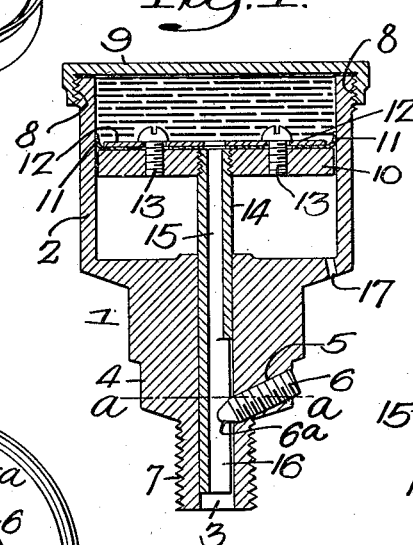
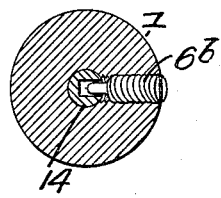
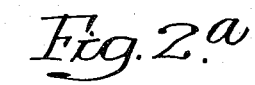
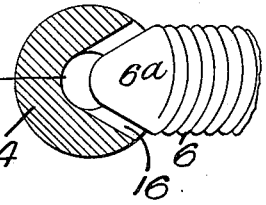
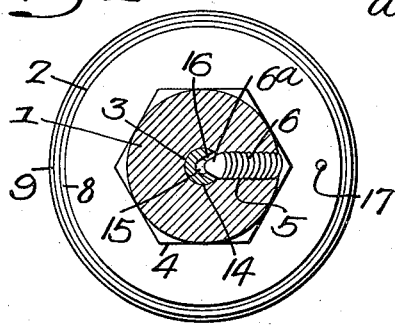
Inventor:—
Ferdinand Q. Hartman.
by his Attorneys—
Howson & Howson

UNITED STATES PATENT OFFICE.

FERDINAND Q. HARTMAN, OF DANVILLE, PENNSYLVANIA.

GREASE-CUP.

1,153,074.

Specification of Letters Patent.

Patented Sept. 7, 1915.

Application filed May 15, 1915. Serial No. 28,321.

*To all whom it may concern:*

Be it known that I, FERDINAND Q. HARTMAN, a citizen of the United States, and a resident of Danville, county of Montour, State of Pennsylvania, have invented certain Improvements in Grease-Cups, of which the following is a specification.

One object of my invention is to improve the construction of centrifugal oil or grease cups, which feed the lubricant automatically while the element to which the cup is applied is rotating.

Another object of my invention is to provide a cup which will feed heavy or semifluid oils.

A further object of the invention is to provide means for regulating the flow of oil from the cup.

These objects and other advantageous ends I secure in the following manner, reference being had to the accompanying drawings in which:

Figure 1 is a vertical sectional view of my improved oil cup; Fig. 2 is an inverted sectional plan view on the line $a$—$a$, Fig. 1; Fig. 2$^a$ is an enlarged sectional view of a portion of Fig. 2; Fig. 3 is a perspective view of the piston; Fig. 4 is a view illustrating a modification; and Fig. 5 is a view showing my improved cup applied to the hub of a loose pulley.

Referring to the drawings, 1 is the body or casing of my improved oil or grease cup having a reservoir 2. Leading from the reservoir is a passage 3 which communicates with the oil passage in the pulley, or other element, to be lubricated. The casing has a hexagonal portion 4 to which a wrench can be applied and has an inclined threaded opening 5 in which is mounted a screw plug 6 which forms a valve for regulating the flow of lubricant from the cup.

7 is the screw threaded end of the cup which is screwed in a threaded opening in the hub of the wheel shown in Fig. 5.

8 is a threaded section at the opposite end of the cup adapted to receive the threaded flange of the cap 9.

10 is a piston mounted in the reservoir and arranged to slide therein. This piston has a cupped shaped ring 11 of leather or other material and held to the piston by a plate 12 and screws 13.

14 is the tubular stem of the piston, which is mounted in the passage 3 of the body portion of the cup and the opening 15 in this stem extends through the plate 12 so as to communicate with the space in the reservoir between the cap and the piston. The lower portion of the stem is slotted, as at 16, and the slot and the opening in the stem are preferably V-shaped, as shown in Fig. 2$^a$, and the end 6$^a$ of the screw valve 6 is conical in shape so as to correspond with the opening in the stem, but the shape of the slot may be rectangular, as shown in Fig. 4, and the end of the screw valve 6$^b$ may be shaped to correspond with it. The valve is arranged at an angle, as clearly shown in Fig. 1, so that the heavy oil will flow more freely past the valve than if it were straight and the under side of the valve forms a more perfect stop than if the valve were at right angles to the openings to prevent the oil from being drawn back into the reservoir.

17 is an air vent in the bottom of the reservoir so as to allow the piston to have free movement toward the cap. When the cup is filled the piston is at the bottom of the reservoir and when the cap is applied it tightly fits the casing. As motion is imparted to the wheel, shown in Fig. 5, for instance, the piston, due to centrifugal force, moves outward toward the cap. This compresses the heavy oil in the reservoir and forces it out through the tubular stem 14 and past the valve 6. The amount of lubricant entering the lubricating space of the wheel will depend upon the adjustment of the valve and the speed at which the wheel is rotated.

I claim:

1. The combination in an oil cup of the centrifugal type, of a casing having a reservoir and a passage which leads from the cup; a piston mounted in the reservoir and having a tubular stem located in the passage, said stem being slotted at the end opposite the piston; and an adjustable valve extending into the slot in the stem and arranged to regulate the flow of oil from the reservoir.

2. The combination of a casing having a reservoir therein and having a passage leading from the reservoir; a cap arranged to close the reservoir; a piston located in the reservoir; a tubular stem projecting from the piston and extending into the passage, the stem being slotted at the lower end and communicating with the space between the piston and the cap; and an inclined adjusting screw having an end conforming to the shape of the slot in the stem.

3. The combination of an oil cup having a reservoir and a passage leading from the reservoir; a cap arranged to close the reservoir; a piston mounted in the reservoir; a tubular stem projecting from the piston and located in the passage, the said tubular stem communicating with the space between the piston and the cap, the opposite end of the stem being slotted, the slot being V-shaped in cross section; and an inclined adjusting screw having a V-shaped end projecting into the slot and so shaped as to regulate the flow of the lubricant from the reservoir through the stem.

FERDINAND Q. HARTMAN.

Copies of this patent may be obtained for five cents each, by addressing the "Commissioner of Patents, Washington, D. C."